United Stat
Mayo

[15] 3,642,472
[45] Feb. 15, 1972

[54] BLEACHING OF HOLOGRAMS

[72] Inventor: Edmund S. Mayo, Wilmington, Del.
[73] Assignee: Holotron Corporation, Wilmington, Del.
[22] Filed: Aug. 30, 1967
[21] Appl. No.: 664,330

[52] U.S. Cl. .................................. 96/27 H, 96/60, 355/2, 350/3.5
[51] Int. Cl. ........................................... G03c 5/44
[58] Field of Search ............... 96/27 H, 60, 50 PL; 355/2; 350/3.5

[56] References Cited

UNITED STATES PATENTS

| | | | |
|---|---|---|---|
| 2,798,004 | 7/1957 | Weigel | 96/50 X |
| 3,189,452 | 6/1965 | Bard et al. | 96/60 X |
| 3,382,490 | 5/1968 | Borka et al. | 178/7.5 D |
| 3,490,827 | 1/1970 | Van Ligten et al. | 350/3.5 |
| 3,501,216 | 3/1970 | Kogelmik | 350/3.5 |
| 2,173,480 | 9/1939 | Jung | 96/67 X |
| 3,083,615 | 4/1963 | El-Sum | 88/24 |
| 3,291,606 | 12/1966 | Jeffreys | 96/56 X |

OTHER PUBLICATIONS

Cathey, Three-Dimensional Wavefront Reconstruction Using a Phase Hologram, Journal of Optical Society of America, 55:457 (1965).

Kozma, Photographic Recording of Spatially Modulated Coherent Light, Journal of Optical Society of America. 56:428-432 (1966).

George et al, Holographic Diffraction Gratings, Applied Physics Letters, Vol. 9, No. 5, pp. 212-215 (Sept. 1966).

*Primary Examiner*—Charles E. Van Horn
*Attorney*—Woodcock, Washburn, Kurtz & Mackiewicz

[57] ABSTRACT

A method for increasing the brightness and quality of a pictorial hologram made from photographic emulsions is disclosed. A critical range of average transmittance of the developed emulsion for an overexposed hologram has been discovered which gives a good-quality image after being bleached. A method for coating a bleached hologram is also disclosed which further improves its image.

9 Claims, 6 Drawing Figures

BLEACHING OF HOLOGRAMS

BACKGROUND OF THE INVENTION

1. Field of the Invention

This invention relates to improvements in the field of holography, and more particularly to an improved hologram and a process for making the improved hologram.

2. Brief Description of the Prior Art

Recently a new method has been discovered for producing a three-dimensional image of an object using wave front reconstruction or "holography." A photographic plate is used to record both amplitude and phase information of an object bearing wave front included in an interference pattern created between an object beam emanating from the object and a coherent reference beam. The recorded interference pattern is called a "hologram" and in the production of the hologram the object beam and the reference beam are directed to the photographic plate at different angles or "off-axis." In reconstructing an image of the original object from the hologram a monochromatic spatially coherent illuminating beam is directed to the hologram at an angle similar to the original reference beam angle and the hologram diffracts the illuminating beam such that a replica of the original bearing wave front is carried in either of two first order diffracted beams. One of the reasons why this method of creating three-dimensional images of objects is now successful is because of the recent development of the laser as a good source of coherent light necessary for the object and reference beams.

The "off-axis" technique of making three-dimensional images of objects by wave front reconstruction utilizing coherent light sources forms the subject matter of copending application Ser. No. 361,977, to Leith et al. filed Apr. 23, 1964, now U.S. Pat. No. 3,506,327, issued Apr. 14, 1970.

As mentioned above, a photographic plate is usually used to record the holographic information; this means that the hologram is formed by exposing a light-sensitive photographic emulsion to the object and reference beams and then developing the exposed photographic emulsion by normal photographic techniques. In certain applications it has been the experience that the photographic emulsions now presently available for producing holograms present certain limitations in the quality of the image reconstructed from the hologram. This situation exists especially in the production of high-quality pictorial holograms. Among these limitations is the fact that for a given light source the brightness of the reconstructed image has not generally been as great as would be desirable due to the relatively low transmission characteristic of these photographic emulsions. In order to produce images of reasonably high brightness level, relatively large power sources have been required. It would be desirable to produce improved holograms which yield higher quality images than heretofore achievable.

It is therefore a primary object of this invention to provide a means for producing holograms of higher quality than heretofore achievable.

It is a more specific object of this invention to provide a method of producing holograms having a higher transmission characteristic than heretofore.

It is another object of this invention to provide a method of making pictorial holograms which permit the reconstruction of images of objects which are brighter than heretofore achievable.

It is a more specific object of this invention to provide a method of reconstructing images of objects in which the power source requirement is lower than has been necessary in the past.

It is still a further object of this invention to provide a pictorial hologram which is capable of reconstructing high-quality images in a much more efficient manner than heretofore.

SUMMARY OF THE INVENTION

Briefly, the objects of this invention are obtained by exposing a hologram detector comprising a photographic emulsion to an object beam and a coherent reference beam in the off-axis technique until the photographic emulsion becomes overexposed to the point that when the photographic emulsion is developed it has a transmission factor of less than 25 percent, the latter percentage transmission being that of a normally exposed hologram. After developing, the overexposed photographic emulsion is bleached until it becomes substantially transparent, thereby converting an amplitude hologram into a phase hologram of increased efficiency. To increase its quality, the bleached hologram may be given a smooth coating to reduce scattering effects which cause noise and, further, the hologram may be treated with a protective solution to keep it from becoming darker with time.

While the invention is distinctly pointed out and claimed in the appended claims, the invention, together with further objects and advantages thereof, may best be understood with reference to the following description of the preferred embodiments which should be taken in conjunction with the following figures.

DESCRIPTION OF THE PREFERRED EMBODIMENTS

Figure 1:
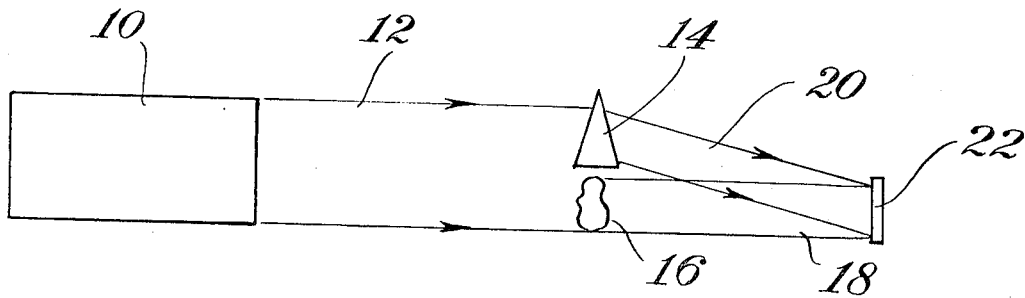
FIG. 1 is a diagrammatical representation of the off-axis technique of producing holograms.

Referring to FIG. 1, a basic configuration for making a hologram with photographic material will be briefly reviewed. The hologram to be produced will contain both amplitude and phase information of the wave front emanating from an object 16 as disclosed in the aforementioned copending application Ser. No. 361,977. A coherent light source 10 emits a broad beam 12 of electromagnetic radiation which preferably is visible light. The light source 10 is preferably a laser with a filtered output that is expanded to a collimated beam of light 12. Part of the light beam 12 is modulated by object 16 and an object beam 18 is reflected and diffracted onto a plate or sheet of photographic material 22. Another part of the coherent light beam 12 is bent by a prism 14 into a reference beam 20 which merges with the object beam 18 at the photographic plate 22, causing an interference pattern which is recorded on the plate.

When the photographic plate 22 is developed by normal methods, holograms 22' is the result, from which an image 16' corresponding to object 16 may be reconstructed. Light beam 24, preferably produced from a coherent light source, strikes hologram 22', and part of it is transmitted directly through hologram 22 in the form of zero order beam 28, another part of it is diffracted into a first-order real image carrying beam 26, and another part of it is diffracted into a first-order virtual image carrying beam (not shown).

In order to keep the power requirement of the source of the illuminating light beam 24 as small as possible and still have an image 16' of adequate brightness, it is desirable to produce the hologram 22' such that it will take as much of the light 24 as possible and diffract it into the desired image carrying beam 26, thus increasing the efficiency of the hologram. It has been found that the brightness of image 16' is maximized for a given hologram 22' and a given intensity of light beam 24 when the beam 24 makes the same angle with the hologram 22' as the reference beam 20 made with photographic plate 22 when the hologram was made (FIG. 1). Furthermore, it has been found that if the density of the emulsion of the developed plate has an average light transmission of about 25 percent, the brightness and the quality of the image will be maximized with other variables held constant.

It has been reported by Cathey in 55 JOSA 457 (1965) that to further increase the efficiency of a hologram, the developed plate may be bleached to a transparency. The brightness increase of the recreated image as a result of the bleaching step is due to reduced attenuation of the incident light. When the plate has been bleached transparent, it is believed that a variable refractive index exists in the emulsion according to the wave front information recorded thereon. A nonbleached interference hologram creates an image of the original object by diffracting the light incident thereon, while a bleached hologram forms this image by refracting such light.

It is noted from the available literature the feeling of others working with holographic gratings is that highly exposed plates produce increased brightness levels of diffracted light. However, it is further noted that these workers feel that if pictorial holograms were to be made with highly exposed plates, the increase in brightness would be accompanied by severe scattering of light or background noise which would degrade the resolution of the image. A pictorial hologram is a holographic grating capable of reconstructing an image of a pictorial object.

According to this invention, it has been discovered that high-quality pictorial holograms can be produced utilizing bleaching to increase the brightness but without the degradation of the image due to background noise, contrary to the present feeling of other workers. By means of this invention, high-quality pictorial holograms have been produced with image brightness levels increased by at least a factor of two over unbleached holograms.

Figure 3:
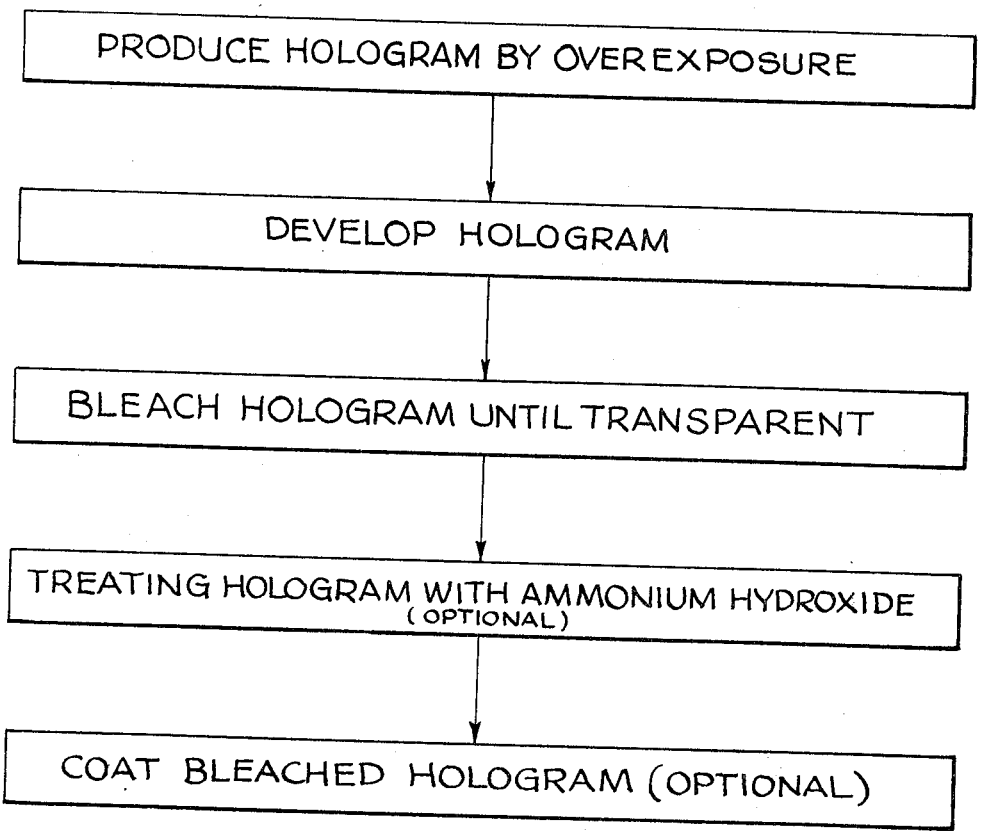
FIG. 3 is a block flow diagram of the method according to the present invention.

Referring to FIG. 3, the steps in making an overexposed bleached hologram according to this invention are set out in diagrammatic form. The first step is to overexpose a photographic emulsion to light reflected from or transmitted through an object which is combined with a reference beam at the photographic emulsion, as is generally shown in FIG. 1. The material generally used to create holograms is Kodak's high resolution emulsion 649-F. The second step is to develop the photographic emulsion by a conventional photographic process. A high-contrast developer, such as Kodak's D-19 or HRP, is preferred.

Figure 2:
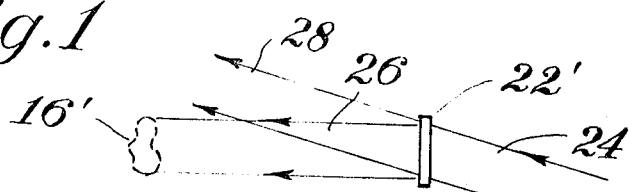
FIG. 2 is a diagrammatical representation of the method of reconstructing images from holograms made in accordance with FIG. 1.

After development, the emulsion appears opaque and an image reconstructed from this hologram in the normal holographic manner as illustrated in FIG. 2 will be very low in brightness. The third step of the process is bleaching which involves two steps; first, the hologram is dipped in a bleaching agent which complexes the exposed emulsion; and secondly, the hologram is rinsed of excess bleaching agent and loose complexed emulsion material. Normally the photographic emulsion comprises silver halide and, after exposure and development, the exposed part of the emulsion comprises atoms of silver. Typical bleaching agents which are suitable include ferric chloride, mercuric chloride, and potassium ferricyanide. A preferred bleaching agent is potassium chlorochromate and the complexed emulsion material will thus comprise silver chromium complexes. The emulsion is bleached by complexing in one of the above agents and rinsing the complexed material away until it has turned transparent as determined by visual inspection during the bleaching step.

Figure 4A:
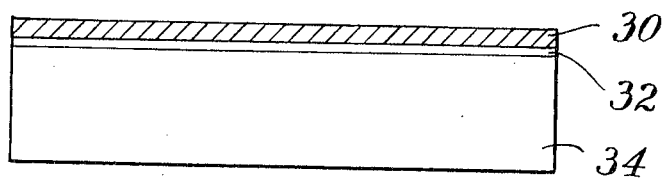
FIGS. 4A and 4B are representations on a greatly enlarged scale of a photographic emulsion both before and after the bleaching step, according to this invention, has been carried out.
Figure 4B:
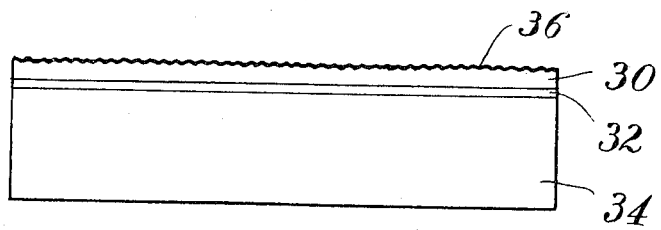

Referring to FIG. 4A, a cross section of an exposed and developed but unbleached plate is shown where overexposed emulsion 30 is bonded by a binding layer 32 to a glass plate backing 34. Referring to FIG. 4B, a cross section of the same plate after the bleaching step is shown where the emulsion 30 is now substantially transparent to the passage of light.

Increasing image brightness by overexposing the photographic emulsion in making a hologram is not completely free of problems since it has been found to affect the quality of the reproduced image. When an emulsion is overexposed sufficiently to become saturated, it is believed that the nonlinearities in that region of operation distorts the image and causes surrounding ghost images. Others working in this art have made brief experiments with holographic gratings in overexposing a photographic emulsion with subsequent bleaching in order to increase image brightness but have reported the method to be unworkable in pictorial holography because of the reduced image quality due to noise.

However, it has also been discovered as part of the present invention that if the overexposed emulsion has an average transmission at least greater than 5 percent after development but before bleaching, the recreated image is not substantially degraded due to noise. If the overexposure of a pictorial hologram is held to at least above 5 percent transmission, an image of good quality has been obtained with a diffraction efficiency of 15 percent as compared to a maximum diffraction efficiency of less than 3 percent from the most efficient nonbleached pictorial hologram. Thus, a pictorial hologram, sufficiently free of noise and of increased brightness and diffraction efficiency, can be produced by bleaching an overexposed hologram if the overexposure is held to within the range of 5-25 percent average transmission.

Figure 4C:
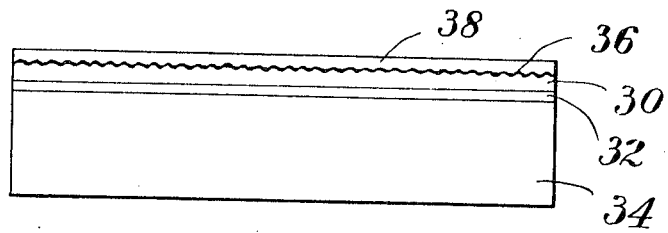
FIG. 4C is a representation, also on an enlarged scale, of a photographic emulsion after a coating step has been performed according to a further embodiment of this invention.

Referring again to FIG. 4B, it is shown that the surface 36 of emulsion 30 is made rough by the etching action of the bleaching agent. This surface roughness causes scattering of light passing through the plate and thus distorts the image information just as would an ordinary diffusion plate. The greater the overexposure the greater is this roughness since the bleaching step carries away more of the exposed surface of the emulsion. This scattering effect is part of the background noise which others have felt would reduce the quality of the image produced from an overexposed pictorial hologram. However, it has been found as part of the present invention that the scattering effect of the rough surface may be substantially eliminated by coating the surface 36 until it is smooth by some transparent substance that is easy to apply, such as gelatin or an acrylic lacquer. This is shown as an optional step of the method outlined in FIG. 3 and a photographic plate in enlarged scale with the smooth coating 38 applied is shown in FIG. 4C.

It has also been observed that bleached holograms in general tend to turn dark after a period of time under certain circumstances. It is believed that constant exposure to ordinary room light causes the bleached emulsion to become dark. It has been found, however, that this tendency may be reduced by treating the hologram by immersion in a dilute solution of ammonium hydroxide. This is shown as an optional step in the method block diagram of FIG. 3.

It will also be appreciated that this invention is also advantageous in the sense that it provides a means for recovering accidentally overexposed holograms. In present practice it is common to discard such holograms as being worthless. At around $10.00 apiece for photographic plates, this advantage is definitely of economic importance.

While the invention has been described with respect to preferred embodiments and experimental results, it should be understood that the invention is not so limited; rather it is intended that the invention be limited only by the spirit and scope of the appended claims.

What is claimed is:

1. A method for making a pictorial hologram capable of creating a high brightness image of an object, comprising the steps of, exposing a silver halide photographic emulsion for a time to an interference pattern created by the merging of two coherent light beams at said emulsion in the off-axis technique;

developing said emulsion for a time, said exposure and development times chosen to result in an average transmittance of between 5 and 25 percent; and bleaching said emulsion until transparent.

2. The method of claim 1 including the additional step of coating said bleached emulsion with a transparent material to produce a smooth surface.

3. The method of claim 2 wherein said transparent material comprises gelatin.

4. The method of claim 2 wherein said transparent material comprises an acrylic lacquer.

5. A method for making an off-axis hologram capable of producing an image of a pictorial object with high brightness, comprising the steps of,
- directing an object beam of coherent light to the object and thence to a silver halide photographic emulsion;
- simultaneously directing a reference beam of coherent light against said emulsion at an angle with said object beam for interference therewith, said object and reference beams being coherent with each other and effective to expose said photographic emulsion;
- developing said emulsion for a time, said exposure and development times chosen to result in an average transmittance of between 5 and 25 percent; and
- bleaching said emulsion until transparent.

6. The method of claim 5 including the additional step of coating the bleached emulsion with a transparent material to produce a smooth surface.

7. A method for making a pictorial hologram capable of creating an image of high brightness, comprising the steps of,
- exposing a silver halide photographic emulsion for a time to an interference pattern created by the merging of two coherent light beams at said emulsion;
- developing said emulsion for a time, said exposure and development times chosen to result in an average film transmittance of less than 25 percent;
- bleaching said emulsion until transparent; and
- coating said emulsion with a transparent material to produce a smooth surface.

8. The method of claim 7 wherein said transparent coating material is gelatin.

9. The method of claim 7 wherein said transparent coating material is acrylic lacquer.

* * * * *